(12) United States Patent
Lau

(10) Patent No.: US 12,388,330 B2
(45) Date of Patent: Aug. 12, 2025

(54) TURBOMACHINE OPERATION MONITORING SYSTEM AND METHOD

(71) Applicant: Siemens Energy, Inc., Orlando, FL (US)

(72) Inventor: James F. Lau, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 294 days.

(21) Appl. No.: 18/160,316

(22) Filed: Jan. 27, 2023

(65) Prior Publication Data

US 2023/0261552 A1  Aug. 17, 2023

Related U.S. Application Data

(60) Provisional application No. 63/309,208, filed on Feb. 11, 2022.

(51) Int. Cl.
| | |
|---|---|
| *H02K 11/27* | (2016.01) |
| *F01D 15/10* | (2006.01) |
| *F01D 21/00* | (2006.01) |
| *H02K 3/12* | (2006.01) |

(52) U.S. Cl.
CPC ............. *H02K 11/27* (2016.01); *F01D 15/10* (2013.01); *F01D 21/003* (2013.01); *H02K 3/12* (2013.01)

(58) Field of Classification Search
CPC . H02K 11/27; H02K 3/12; H02K 1/26; H02K 11/0094; H02K 11/20; H02K 2213/03; H02K 15/00; F01D 15/10; F01D 21/003; F05D 2220/76; F05D 2270/335
See application file for complete search history.

(56) References Cited

U.S. PATENT DOCUMENTS

| 3,182,577 | A | 5/1965 | Ohnaka |
| 2004/0189279 | A1 | 9/2004 | Rao et al. |

FOREIGN PATENT DOCUMENTS

DE  602004008132 T2  5/2008

*Primary Examiner* — Christopher M Koehler
*Assistant Examiner* — Viswanathan Subramanian

(57) ABSTRACT

A method of monitoring the operation of a turbomachine includes positioning a flux probe in an operating position with respect to a rotor of the turbomachine, rotating the rotor at an operating speed with respect to a stator to one of generate an electrical output and produce an output torque. The method also includes measuring the passage of each slot of a plurality of slots formed in the rotor using the flux probe, calculating a time duration between the passage of a first slot of the plurality of slots and a second slot of the plurality of slots, and comparing an expected time duration for the operating speed with the calculated time duration. A difference in the comparison is indicative of one of a power change and a torsional vibration condition.

15 Claims, 5 Drawing Sheets

TURBOMACHINE OPERATION MONITORING SYSTEM AND METHOD

BACKGROUND

Turbomachines include motors and generators. Generators are often used for power generation activities to generate grid-suitable electricity using a prime mover such as a gas turbine, steam turbine, wind turbine, hydro turbine, and the like to drive the generator. The generators generally include a stator that remains stationary during operation and a rotor that rotates with respect to the stator. The rotor often includes two or more poles that when rotated interact with the stator to generate the desired current at the desired frequency and voltage.

BRIEF SUMMARY

In one aspect, a method of monitoring the operation of a turbomachine includes positioning a flux probe in an operating position with respect to a rotor of the turbomachine, rotating the rotor at an operating speed with respect to a stator to one of generate an electrical output and produce an output torque. The method also includes measuring the passage of each slot of a plurality of slots formed in the rotor using the flux probe, calculating a time duration between the passage of a first slot of the plurality of slots and a second slot of the plurality of slots, and comparing an expected time duration for the operating speed with the calculated time duration. A difference in the comparison is indicative of one of a power change and a torsional vibration condition.

In one aspect, a method of determining a power level for a turbomachine includes positioning a flux probe in an operating position with respect to a rotor of the turbomachine, operating the turbomachine to rotate the rotor at an operating speed with respect to a stator, and measuring a flux using the flux probe for a full rotation of the rotor. The method also includes calculating a flux density curve for each rotation of the rotor, determining a first position of the rotor with respect to the flux probe when the value of the flux density curve equals zero, and determining the power level based solely on the first position.

In one aspect, a turbomachine system includes a flux probe in an operating position with respect to a rotor of the turbomachine, the rotor rotatable at an operating speed with respect to a stator to one of generate an electrical output and produce an output torque. The turbomachine system also includes a processor and a memory storing instructions that, when executed by the processor, configure the turbomachine system to measure the passage of each slot of a plurality of slots formed in the rotor using the flux probe, calculate a time duration between the passage of a first slot of the plurality of slots and a second slot of the plurality of slots, and compare an expected time duration for the operating speed with the calculated time duration. A difference in the comparison is indicative of one of a power change and a torsional vibration condition.

The foregoing has broadly outlined some of the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
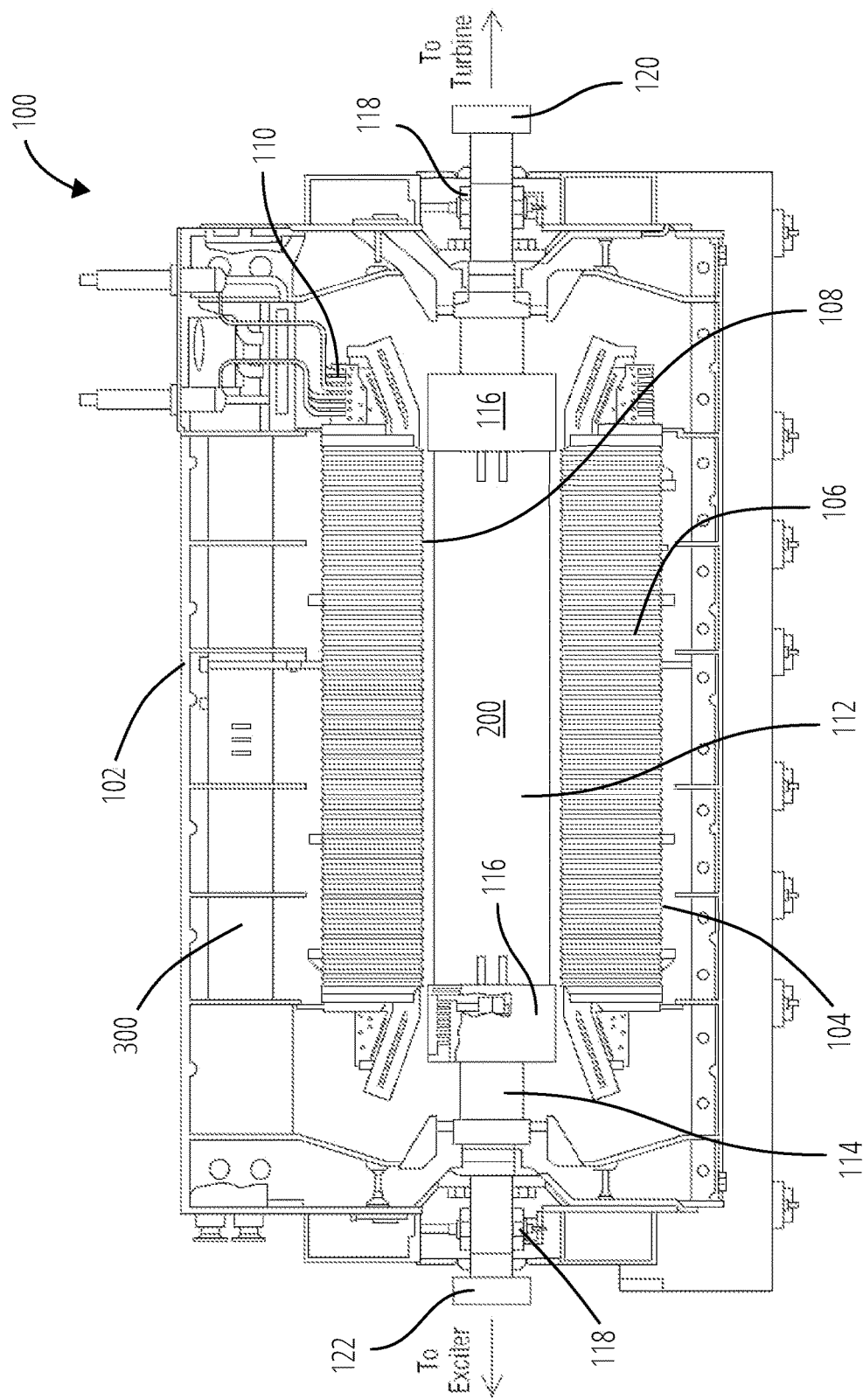
FIG. 1 is a cross-sectional view of a generator taken along the generator centerline, rotational, or longitudinal axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

It should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

As illustrated in FIG. 1, a generator 100 includes a stator 300 and a rotor 200 supported for rotation within the stator 300. The stator 300 includes a stator housing 102 that surrounds and substantially encloses a stator core 104. The stator core 104 is often made-up of a number of laminations 106 stacked in a longitudinal direction (along a rotational axis). Each lamination 106 includes cut outs or is otherwise shaped to define the desired features of the rotor core, including a bore 108 that is sized to receive the rotor 200.

In some constructions, a stator cooling system 110 is provided to cool the stator 300 and improve the efficiency and power density of the stator 300. In some constructions, a cooling gas is employed as a stator coolant. However, larger stators 300 may include liquid cooling such as water cooling.

The rotor 200 includes a rotor core 112, a rotor shaft 114, and two retaining rings 116 coupled to the rotor shaft 114. The illustrated rotor shaft 114 is supported for rotation by a bearing 118 positioned at each end of the rotor 200. A turbine coupling 120 is positioned at one end of the rotor 200 to facilitate connection of the rotor 200 to a turbine (e.g., combustion turbine, steam turbine, hydro turbine, wind turbine, etc.) or to another prime mover. The opposite end of the rotor 200 may include an exciter coupling 122 that allows for connection to an exciter or other rotating equipment.

The generator 100 illustrated in FIG. 1 is a synchronous generator 100. However, asynchronous generators or motors could include the features described herein.

Figure 2:
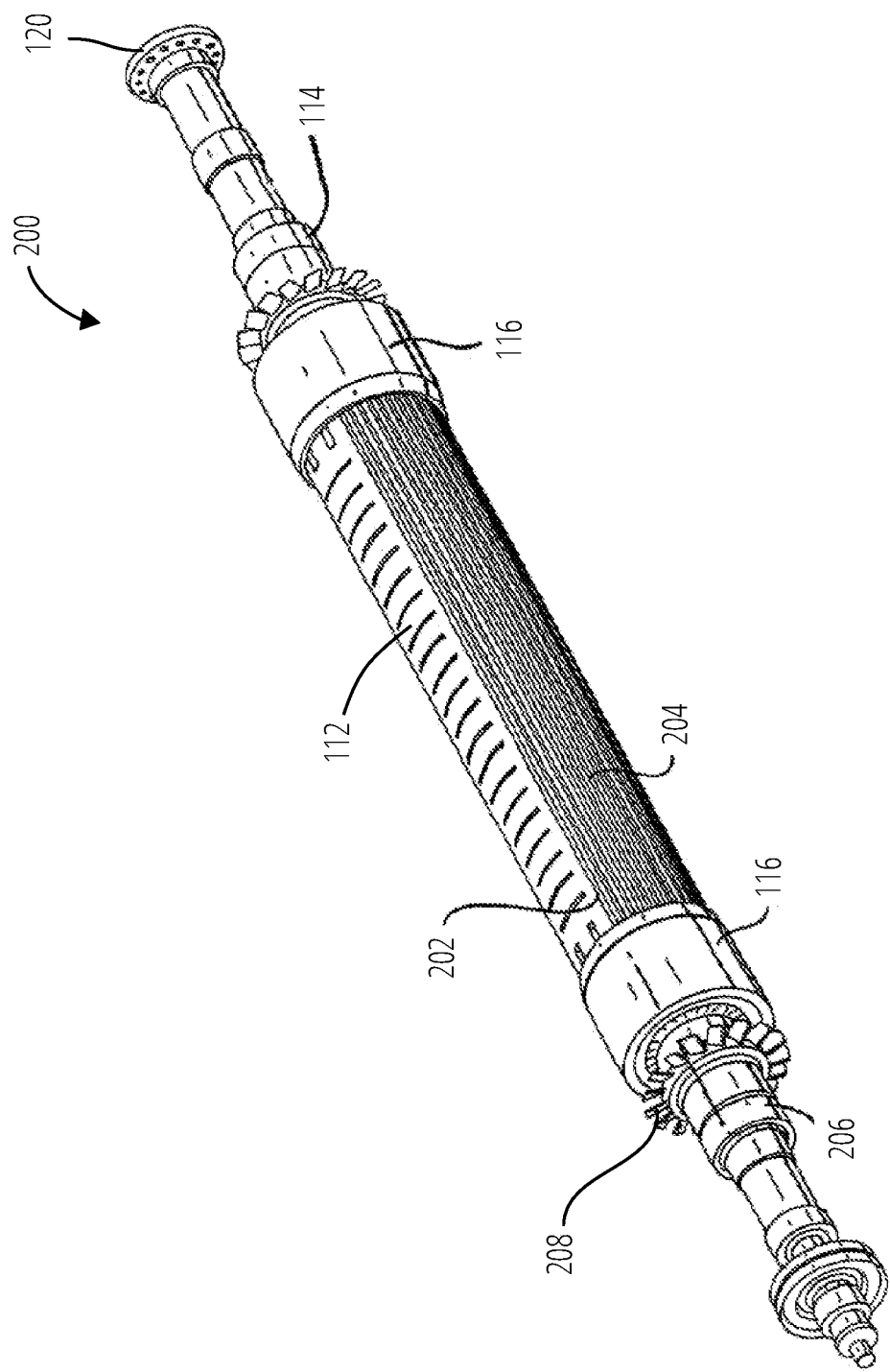
FIG. 2 is a perspective view of a rotor suitable for use in the generator of FIG. 1.

FIG. 2 illustrates the rotor 200 of FIG. 1 in greater detail. The rotor core 112 includes a series of rotor slots 202 that extend longitudinally along the rotor core 112. Rotor windings 204 are positioned within the rotor slots 202 to define one or more pairs of poles. In the illustrated construction two poles are formed by the rotor windings 204. However, other constructions could include four poles, eight poles or more poles if desired. The rotor 200, sometimes referred to as a field, also includes a commutator 206 that provides a connection to an exciter that provides electrical current at a desired voltage to the windings 302 to generate a magnetic field.

The rotor 200 may also include a rotor cooling system 208 that operates to cool the rotor 200. In some constructions, the rotor 200 is air-cooled with other constructions employing another fluid such as hydrogen.

Figure 3:
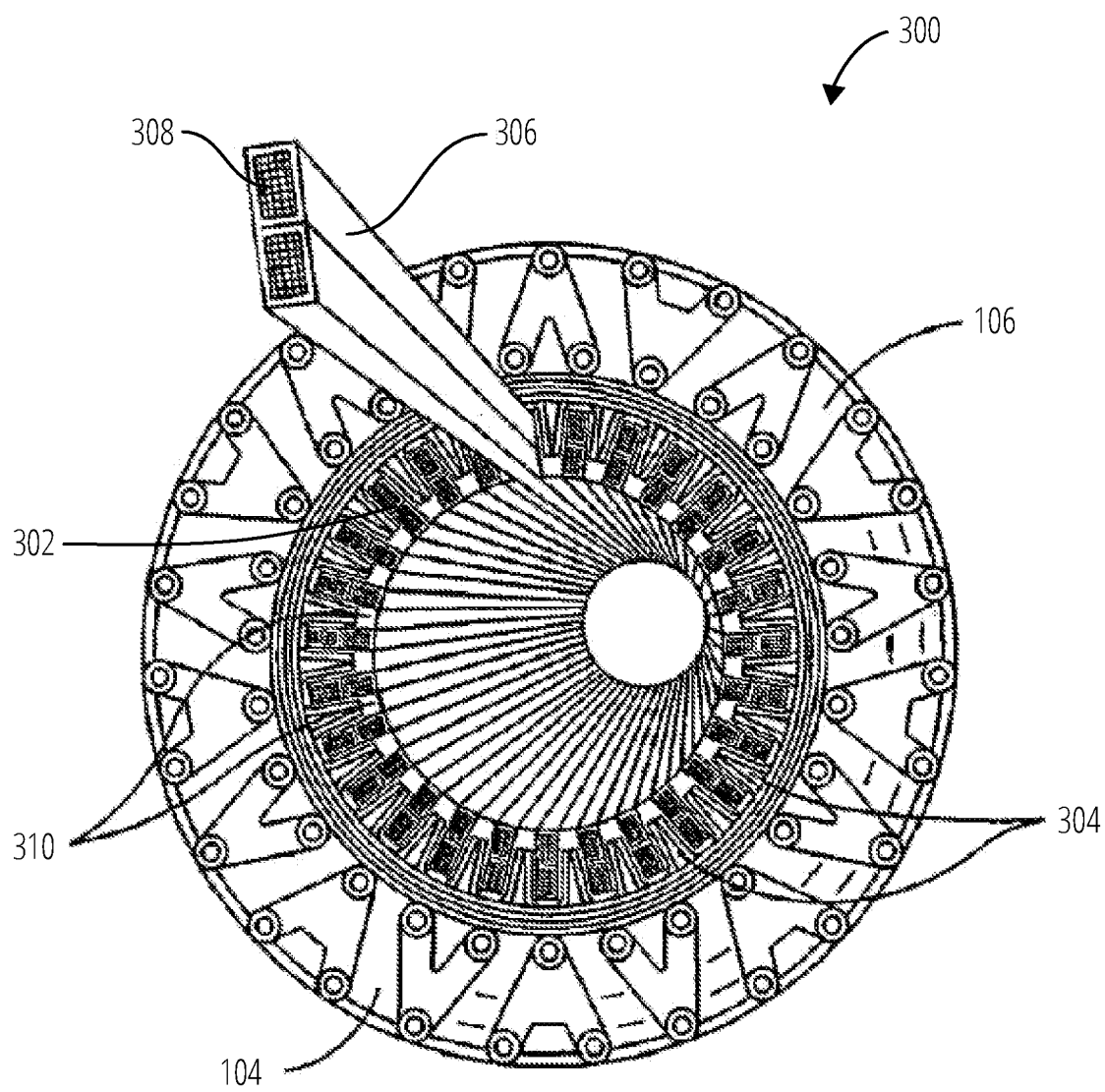
FIG. 3 is a perspective view of a portion of a stator suitable for use in the generator of FIG. 1.

Turning to FIG. 3, the stator core 104 is illustrated in greater detail. The stator core 104, in most constructions is formed from a series of laminations 106 that are stacked in the longitudinal direction. Each lamination 106 includes cut-outs, openings or features that when stacked define the desired features of the stator core 104. Each of the laminations 106 includes a number of teeth 304 that are evenly spaced circumferentially around the bore 108. the teeth 304 cooperate to define a series of slots that extend the length of the stator core 104. Bars 306 are positioned within the slots and are electrically connected to one another to define a series of windings 302. In the illustrated generator 100, the windings 302 are arranged to define three phases. Generally, the three phases are electrically arranged to define a delta-circuit, or a Y-circuit as may be desired. Of course, other constructions could include a single phase if desired.

As part of the stator cooling system 110, each of the bars 306 includes one or more coolant passages 308 that allow for the flow of coolant along the length of the bar 306. As discussed, a coolant fluid such as water is often employed to cool the generator.

Figure 4:
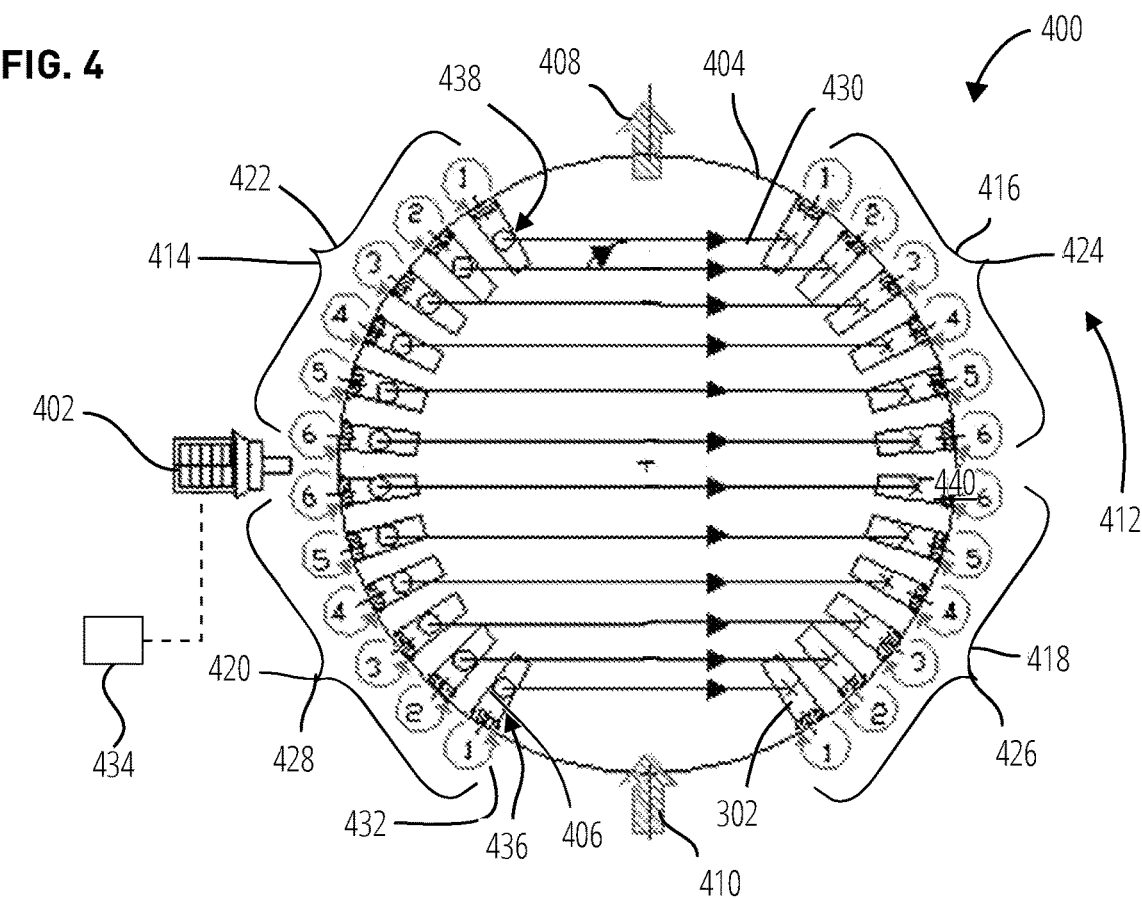
FIG. 4 is a schematic illustration of a rotor arrangement including a flux probe in an operating position.

Before discussing FIG. 4 in detail, it should be noted that the system described herein is applicable to virtually any electrical turbomachine. Specifically, it is applicable to virtually any type of generator and motor. When the turbomachine operates as a motor, a current is applied to the rotor 200 and power is directed to the stator 300 to generate a usable torque at the rotor 200. When operated as a generator, a current and a torque are applied to the rotor 200 to generate a usable electrical power output at the stator 300. The remainder of this description will focus on an example that is operated as a generator. However, it should be clear that it is equally applicable to a motor.

FIG. 4 illustrates a rotor arrangement 400 suitable for use in a system that monitors certain operating parameters of the rotor 200 using a flux probe 402. The rotor 200 includes a rotor body 404 that is generally formed from a solid or laminated ferromagnetic material. A plurality of slots 406 are formed in the body 404 and extend along a portion of the length of the body 404. In the rotor 200 of FIG. 4, the slots 406 are arranged to define two poles, an A-pole 408 and a B-pole 410. Other constructions may include slots 406 arranged to define four poles, or more than four poles as may be desired.

The slots 406 are arranged in pairs with a leading slot formed on one side of a pole and a lagging slot formed on the opposite side of the pole. The leading and lagging sides of the pole are defined with respect to the direction of rotation 412 of the rotor 200. The leading side passes a fixed point (e.g., the flux probe 402) on any rotation before the lagging side. With reference to the rotor 200 of FIG. 4, leading A-slots 414 are formed on the leading side of the A-pole 408 with a corresponding number of lagging A-slots 416 formed on the opposite side of the A-pole 408. Similarly, leading B-slots 418 are formed on the leading side of the B-pole 410 with lagging B-slots 420 formed on the opposite side of the B-pole 410. In the illustrated construction, six slots 406 are employed on each side of each pole with other constructions having more or fewer slots 406 as may be desired.

To form the electrical circuit in the rotor 200, windings 302 are placed in each of the slots 406. Each winding 302 is a complete loop that extends around on of the A-pole 408 or the B-pole 410. As such, each winding 302 includes a leading portion disposed in a leading slot 406 and a lagging portion disposed in a lagging slot 406. In addition, multiple windings 302 are generally stacked on top of one another within each of the slots 406 to provide the number of turns desired around each of the poles. With reference to the example of FIG. 4, leading A-windings 422 are positioned in the leading A-slots 414 and lagging A-windings 424 are placed in the lagging A-slots 416. Similarly, leading B-windings 426 are positioned in the leading B-slots 418 and lagging B-windings 428 are placed in the lagging B-slots 420.

During operation, a current 430 is passed through each of the windings 302. The current 430 flows through each of the windings 302 in a loop around its respective pole to magnetize each of the A-pole 408 and B-pole 410 thereby producing a rotating magnetic field when the rotor 200 is rotated. As the current 430 flows along the length of the slots 406 it produces a magnetic flux 432 at the top or outermost surface of each slot 406. The direction of the flux 432 at each slot 406 is a function of the direction of the current 430 in the windings 302 disposed in the slots 406. In the example of FIG. 4, the current 430 is flowing in a direction out of the page on the left side and into the page on the right side. This leads to counterclockwise fluxes 432 on the left side of the rotor 200 and clockwise fluxes 432 on the right side of the rotor 200.

The flux probe 402 is positioned adjacent the rotor 200 and in close enough proximity to detect these fluxes 432 as each of the slots 406 rotates past the flux probe 402. The actual circumferential position of the flux probe 402 with respect to the rotor is not relevant so long as it is capable of measuring a full rotation of the rotor 200 and that position is known to a computer system 434 that will ultimately analyze the data generated by the flux probe. The computer system 434 could be part of an engine control system or part of a separate system used only to monitor and analyze the outputs from the flux probe 402 as may be desired.

Figure 5:
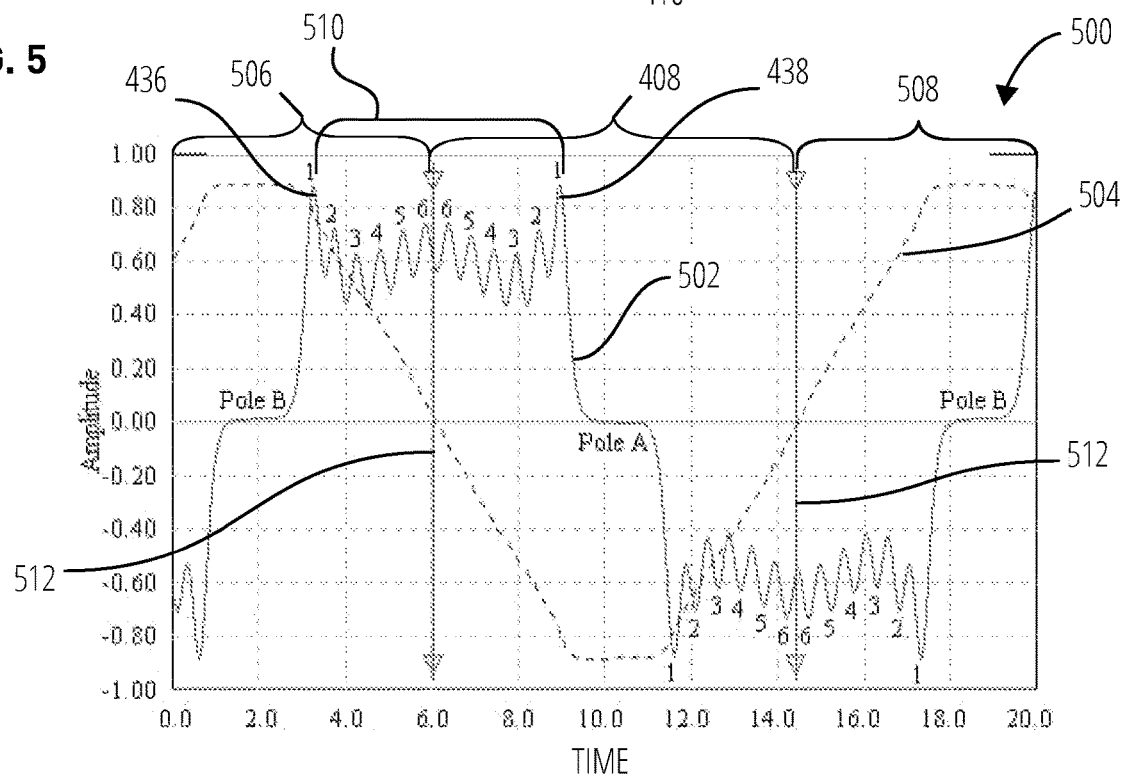
FIG. 5 is a chart illustrating the data collected by the flux probe of FIG. 4 for one rotation of the rotor at a no load or zero power output condition.
Figure 6:
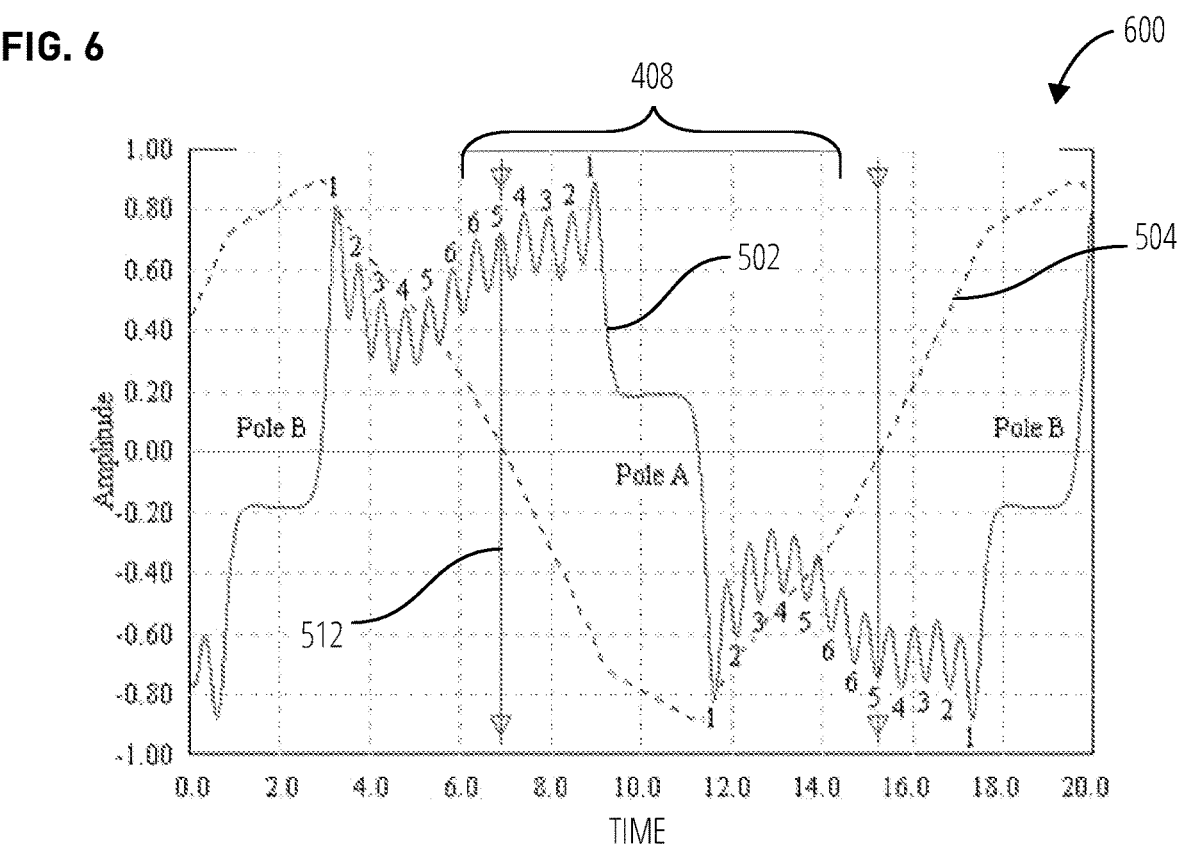
FIG. 6 is a chart illustrating the data collected by the flux probe of FIG. 4 for one rotation of the rotor at a medium load or medium power output condition
Figure 7:
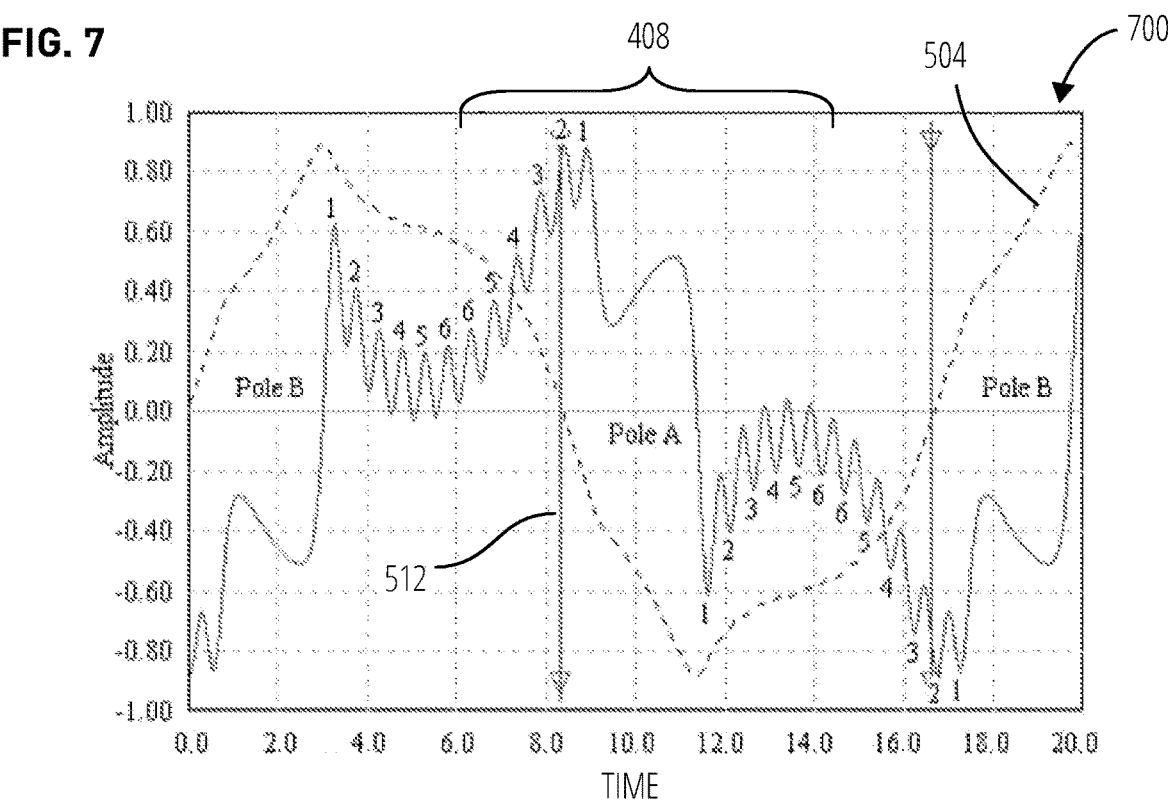
FIG. 7 is a chart illustrating the data collected by the flux probe of FIG. 4 for one rotation of the rotor at a high load or high power output condition.

For FIG. 5 through FIG. 7, counterclockwise fluxes 432 will be deemed positive and clockwise fluxes 432 will be deemed negative. Of course, this could be reversed if desired. As such, the terms "positive" and "negative" refer to the example provided but should not be limiting as they could be reversed simply by changing the positive and negative values for the flux 432.

FIG. 5 includes a chart 500 showing the data collected by the flux probe 402 for one rotation plotted as a flux curve 502. The flux curve 502 is plotted with time (in microseconds) along the X-axis and a normalized amplitude of the flux along the Y-axis. The illustrated flux curve 502 includes one full rotation of the rotor (i.e., about 0.017 seconds at 3600 RPM, or 0.02 seconds at 3000 RPM). In addition, a flux density curve 504 is plotted for the same time frame. The flux density curve 504 is calculated from the data collected to develop the flux curve 502. In preferred constructions, a sampling rate of 0.1 ms is employed for the flux probe 402 with faster or slower sampling rates being possible.

The flux curve 502 illustrates data collected from the B-pole 410 between time "zero" and 6 ms. Specifically, this portion of the flux curve 502 illustrates the measured flux from a lagging B-pole 506. The central portion of the flux curve 502 (between about 6 ms and 14.5 ms) illustrates data collected from the A-pole 408. The remainder of the flux curve 502 illustrates the other portion of the B-pole 410 and specifically the data from a leading B-pole 508.

The flux probe 402 measures peaks or spikes (positive or negative) of flux as each slot 406 passes the flux probe 402. The largest of these spikes is typically at a slot 406 that only includes one immediately adjacent slot 406. Specifically, with reference to the positive portion of the flux curve 502 there is a large spike as a first lagging B-slot 436 passes the flux probe 402 and as a first leading A-slot 438 passes. A measured time period 510 between the passage of the first lagging B-slot 436 and the first leading A-slot 438 can be compared to a calculated time period for the rotor 200 to rotate the same distance to make some evaluations regarding the status of the rotor 200. For example, for a rotor 200 with the first lagging B-slot 436 and the first leading A-slot 438 separated by about 115 degrees and that should rotate at 3600 rpm, a calculated time period may be about 5.32 ms. If the comparison of the calculated time period and the measured time period 510 shows that the measured time period 510 is longer than the expected or calculated time period, one can conclude that the rotor 200 is rotating slightly slower than expected. This may be indicative of a load increase or a torsional vibration. If the difference slowly decays to zero with subsequent revolutions, it might be indicative of a load change. If the difference varies with each revolution, it may be indicative of a torsional vibration. In the case of a torsional vibration, repeated measurements from subsequent rotations can be used to estimate a vibration frequency. In addition to this comparison, the measured time period 510 (sometimes referred to as calculated time period) can be used to calculate an actual rotating speed of the rotor 200 which can be provided to a user.

Additional information can be extracted from the chart 500 of FIG. 5. The flux density curve 504 moves in a generally sinusoidal pattern, oscillating from a positive peak to a negative peak and back to a positive peak with each rotation. Because of this oscillation, the flux density curve 504 crosses a zero amplitude twice during each rotation. This point is illustrated as a pair of zero flux density times 512 illustrated on the chart 500. As will be better illustrated in the upcoming figures, the position of the rotor 200 when this crossing occurs is indicative of the load or the power output of the generator 100.

FIG. 5 illustrates a generator 100 operating in a no load or zero power output condition. In this operating condition, the zero flux density times 512 occur directly between the passage of the A-pole 408 and the B-pole. In other words, the rotor 200 has rotated one of the poles, in FIG. 5 the B-pole 410 ninety degrees past the flux probe 402.

FIG. 6 illustrates a second chart 600 of the data collected by the flux probe 402 for a rotation of the rotor 200 operating at a medium power output or load. As can be seen, the shape of the flux curve 502 has changed slightly which changes the shape of the flux density curve 504 and shifts the zero flux density times 512 to the right or toward the pole in front of the zero flux density time 512.

FIG. 7 illustrates a third chart 700 of the data collected by the flux probe 402 for a rotation of the rotor 200 operating at a high power output or load. As can be seen, the shape of the flux curve 502 has changed slightly which changes the shape of the flux density curve 504 and shifts the zero flux density times 512 further to the right or toward the pole in front of the zero flux density time 512.

It should be noted that the measured time period 510 between the first lagging B-slot 436 and the first leading A-slot 438 does not change with the changing load such that this measured time period 510 can be a reliable indication of speed.

In operation, an exciter or other system provides current at a desired voltage to the rotor 200. The current flows through the rotor windings 204 to establish two magnetic poles in a two-pole generator and more poles in higher pole generators. The turbine, or other prime mover is coupled to the rotor 200 and operates to rotate the rotor 200 at a desired speed. For a synchronous generator with a two-pole rotor 200, the rotor is rotated at 3600 RPM to generate 60 Hz electricity. For electricity at 50 Hz, the rotor 200 is rotated at 3000 RPM.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A method of monitoring the operation of a turbomachine, the method comprising:
    positioning a flux probe in an operating position with respect to a rotor of the turbomachine;
    rotating the rotor at an operating speed with respect to a stator to one of generate an electrical output and produce an output torque;
    measuring the passage of each slot of a plurality of slots formed in the rotor using the flux probe;
    calculating a time duration between the passage of a first slot of the plurality of slots and a second slot of the plurality of slots;
    comparing an expected time duration between the passage of the first slot and the second slot when operating at an operating speed with the calculated time duration, a difference in the comparison indicative of one of a power change and a torsional vibration condition, wherein the rotor defines an A-pole having a first A-winding disposed in a first A-slot, the first A-slot including a first leading A-slot and a first lagging A-slot, and a B-pole having a first B-winding disposed in a first B-slot, the first B-slot including a first leading B-slot and a first lagging B-slot, and wherein the first slot is the first lagging B-slot and the second slot is the first leading A-slot.

2. The method of claim 1, wherein the rotor defines an A-pole having a plurality of A-windings disposed in a corresponding plurality of A-slots, and a B-pole having a plurality of B-windings disposed in a corresponding plurality of B-slots, the method further comprising calculating a flux density curve using the flux probe, the flux density curve having an amplitude of zero at least twice per rotation of the rotor.

3. The method of claim 2, further comprising determining the position of the plurality of A-windings and the plurality of B-windings at the time the amplitude of the flux density curve is zero, the position of the plurality of A-windings and the plurality of B-windings being indicative of a power output of the turbomachine.

4. The method of claim 3, wherein the plurality of A-windings are divided into a plurality of leading A-windings and a plurality of trailing A-windings, and wherein the A-pole is disposed between the plurality of leading A-windings and the plurality of trailing A-windings, and wherein the time between the A-pole passing the flux probe and the next time the amplitude of the flux density curve is zero decreases as power increases.

5. The method of claim 2, further comprising determining that the turbomachine is operating in a no-load condition in response to the flux probe detecting the passage of one of the A-pole and the B-pole one-quarter of a rotational period after the time the amplitude of the flux density curve is zero.

6. A method of determining a power level for a turbomachine, the method comprising:
    positioning a flux probe in an operating position with respect to a rotor of the turbomachine;
    operating the turbomachine to rotate the rotor at an operating speed with respect to a stator;
    measuring a flux using the flux probe for a full rotation of the rotor;
    calculating a flux density curve for each rotation of the rotor;
    determining a first position of the rotor with respect to the flux probe when the value of the flux density curve equals zero; and
    determining the power level based solely on the first position, wherein the rotor defines an A-pole having a first A-winding disposed in a first A-slot, the first A-slot including a first leading A-slot and a first lagging A-slot, and a B-pole having a first B-winding disposed in a first B-slot, the first B-slot including a first leading B-slot and a first lagging B-slot, the method further comprising determining a time duration between the time the first lagging B-slot passes the flux probe and the time the first leading A-slot passes the flux probe and comparing that time to an expected time duration, a difference between the determined time duration and the expected time duration indicative of one of a power change and a torsional vibration condition.

7. The method of claim 6, wherein the rotor defines an A-pole having a plurality of A-windings disposed in a corresponding plurality of A-slots, and a B-pole having a plurality of B-windings disposed in a corresponding plurality of B-slots, the flux density curve having an amplitude of zero at least twice per rotation of the rotor.

8. The method of claim 7, further comprising determining the position of the plurality of A-windings and the plurality of B-windings at the time the amplitude of the flux density curve is zero, the position of the plurality of A-windings and the plurality of B-windings at the time the amplitude of the flux density curve is zero being indicative of the power level of the turbomachine.

9. The method of claim 8, wherein the plurality of A-windings are divided into a plurality of leading A-windings and a plurality of trailing A-windings, and wherein the A-pole is disposed between the plurality of leading A-windings and the plurality of trailing A-windings, and wherein the time between the A-pole passing the flux probe and the next time the amplitude of the flux density curve is zero decreases as power increases.

10. The method of claim 7, further comprising determining that the turbomachine is operating in a no-load condition in response to the flux probe detecting the passage of one of the A-pole and the B-pole one-quarter of a rotational period after the time the amplitude of the flux density curve is zero.

11. A turbomachine system comprising:
a flux probe in an operating position with respect to a rotor of the turbomachine, the rotor rotatable at an operating speed with respect to a stator to one of generate an electrical output and produce an output torque;
a processor; and
a memory storing instructions that, when executed by the processor, configure the turbomachine system to:
measure the passage of each slot of a plurality of slots formed in the rotor using the flux probe;
calculate a time duration between the passage of a first slot of the plurality of slots and a second slot of the plurality of slots; and
compare an expected time duration for the passage of the first slot and the second slot when operating at an operating speed with the calculated time duration, a difference in the comparison indicative of one of a power change and a torsional vibration condition, wherein the rotor defines an A-pole having a first A-winding disposed in a first A-slot, the first A-slot including a first leading A-slot and a first lagging A-slot, and a B-pole having a first B-winding disposed in a first B-slot, the first B-slot including a first leading B-slot and a first lagging B-slot, and wherein the first slot is the first lagging B-slot and the second slot is the first leading A-slot.

12. The turbomachine system of claim 11, wherein the rotor defines an A-pole having a plurality of A-windings disposed in a corresponding plurality of A-slots, and a B-pole having a plurality of B-windings disposed in a corresponding plurality of B-slots, wherein the instructions further configure the turbomachine system to calculate a flux density curve using the flux probe, the flux density curve having an amplitude of zero at least twice per rotation of the rotor.

13. The turbomachine system of claim 12, wherein the instructions further configure the turbomachine system to determine the position of the plurality of A-windings and the plurality of B-windings at the time the amplitude of the flux density curve is zero, the position of the plurality of A-windings and the plurality of B-windings at the time the amplitude of the flux density curve is zero being indicative of a power output of the turbomachine.

14. The turbomachine system of claim 13, wherein the plurality of A-windings are divided into a plurality of leading A-windings and a plurality of trailing A-windings, and wherein the A-pole is disposed between the plurality of leading A-windings and the plurality of trailing A-windings, and wherein the time between the A-pole passing the flux probe and the next time the amplitude of the flux density curve is zero decreases as power increases.

15. The turbomachine system of claim 12, wherein the instructions further configure the turbomachine system to determine that the turbomachine is operating in a no-load condition in response to the flux probe detecting the passage of one of the A-pole and the B-pole one-quarter of a rotational period after the time the amplitude of the flux density curve is zero.

* * * * *